(12) United States Patent
Teague (10) Patent No.: US 11,861,646 B1
(45) Date of Patent: Jan. 2, 2024

(54) DUAL GEO-LOCATED COUPON MANAGEMENT

(71) Applicant: Brian Teague, Dallas, TX (US)

(72) Inventor: Brian Teague, Dallas, TX (US)

( * ) Notice: Subject to any disclaimer, the term of this patent is extended or adjusted under 35 U.S.C. 154(b) by 0 days.

(21) Appl. No.: 18/093,806

(22) Filed: Jan. 5, 2023

(51) Int. Cl.
*G06Q 30/0207* (2023.01)
*H04W 4/021* (2018.01)

(52) U.S. Cl.
CPC ..... *G06Q 30/0225* (2013.01); *G06Q 30/0222* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 8,799,060 B2 | 8/2014 | Gillenson et al. | |
| 9,959,552 B2 | 5/2018 | Bezancon et al. | |
| 10,552,860 B2 | 2/2020 | Logsdon | |
| 11,334,919 B2 | 5/2022 | McDevitt et al. | |
| 2007/0174259 A1* | 7/2007 | Amjadi | G06F 16/951 |
| 2008/0167991 A1* | 7/2008 | Carlson | G06Q 30/0215 705/50 |
| 2010/0036772 A1* | 2/2010 | Arceneaux | G06Q 20/387 455/414.1 |
| 2013/0054422 A1* | 2/2013 | DeSouza | G06Q 30/00 705/27.1 |
| 2015/0235268 A1* | 8/2015 | Bell | G06Q 30/0252 705/14.5 |
| 2015/0302456 A1* | 10/2015 | Rego | G06Q 30/0235 705/14.35 |
| 2015/0348169 A1 | 12/2015 | Harris et al. | |
| 2022/0383361 A1* | 12/2022 | Bennati | H04L 63/0442 |

OTHER PUBLICATIONS

H. Tara Johnson, "Target Customers on the Go with Hyperlocal Geofencing Ads", retrieved from https://tinuiti.com/blog/ecommerce/hyperlocal-geofencing-ads/, available on Nov. 28, 2021 (Year: 2021).*

* cited by examiner

*Primary Examiner* — Sam Refai
(74) *Attorney, Agent, or Firm* — Southern Methodist University (57) ABSTRACT

The solution described herein provides a system for issuing and redeeming digital coupons. This includes receiving a request for a digital coupon from a user device including a unique hardware identifier (ID). Then sending a first localization request and receiving, a first location of the user device. In response, generating a software object representing the digital coupon and including a security token, sending the software object to the user device, updating a status of the digital coupon as issued in a database, storing the unique hardware ID in the database, and associating the unique hardware ID with the digital coupon. Receiving a request to redeem the digital coupon from the user device. In response, sending a second localization request, receiving a second location of the user device, providing a redemption code, and updating the status of the digital coupon as redeemed.

17 Claims, 3 Drawing Sheets

DUAL GEO-LOCATED COUPON MANAGEMENT

TECHNICAL FIELD

This disclosure generally relates to computer-implemented methods, software, and systems for managing geo-located issuance and redemption of digital coupons.

BACKGROUND

Merchants or retailers often use discount prices as a marketing technique. These prices can be offered to individuals by issuing a coupon that, upon redemption, entitles the bearer to a reduced purchase price for a good or service. In a digital world, coupons can be less effective in that it is more difficult to control who is issued the coupon, and to verify the validity of the coupon when it is redeemed.

SUMMARY

In general, this disclosure involves systems, software, and computer implemented methods for managing digital coupons that are geo-located at issuance and redemption. The method includes receiving a request for a digital coupon from a user device, the request including a unique hardware identifier (ID). Then sending a first localization request to the user device and receiving, from the user device, a first location of the user device. In response, generating a software object representing the digital coupon and including a security token, sending the software object to the user device, updating a status of the digital coupon as issued in a database, storing the unique hardware ID in the database, and associating the unique hardware ID with the digital coupon. Receiving a request to redeem the digital coupon from the user device, the request including the security token. In response, sending a second localization request to the user device, receiving a second location of the user device, providing a redemption code configured to enable redemption of the digital coupon to the user device, and updating the status of the digital coupon as redeemed.

Implementations can optionally include one or more of the following features.

In some instances, the unique hardware ID is at least one of a MAC address, a UUID, or an IMEI.

In some instances, the first location and the second location of the user device are generated using an HTML 5 protocol.

In some instances, before generating a software object representing the digital coupon, the first location of the user device is verified to be within a first geo-fence. In some instances, before providing a redemption code to the user device, the second location is verified to be within a second geo-fence. In some instances the first and the second geo-fence are different.

In some instances, the security token is generated based on the unique hardware ID, and the security token is generated using asymmetric encryption.

In some instances, storing the unique hardware ID in the database and associating the unique hardware ID with the digital coupon includes storing the unique hardware ID and the digital coupon in the database as a key value pair, where the hardware ID is a key of the key value pair, and the digital coupon is a value of the key value pair.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The solution described herein provides a system for issuing and redeeming digital coupons that works using existing software architecture of both point of sale systems and customer systems, and therefore requires no additional software from either party (the customer or the merchant) in order to implement. Further the solution described enables secure localization at both issuance and redemption, enabling unique promotional offers and enhancing digital coupon security. In the described solution, a vendor or merchant can set up a digital coupon to be issued and redeemed using a digital management system. The digital management system will generate an offer program according to rules or preferences established by the merchant, and then provide the merchant with a redemption code associated with that offer program. In order to issue a coupon, the digital management system can verify a hardware identification (ID) for a customer device and a physical location (e.g., based on GPS or HTML 5 localization functions) and generate a coupon uniquely associated with that hardware ID. If the customer device is outside of a permitted location for issuance, or otherwise doesn't satisfy the rules established by the merchant, the digital management system can refuse to issue. Otherwise, the digital management system can generate a software object that includes a coupon that is uniquely associated with the hardware ID of the customer device. This coupon object can be downloaded by the customer for storage within their device's digital wallet. For example, for an Apple user, the coupon object can be a PKPASS file that is stored within Apple Wallet. In another example, the coupon object can be a JSON object, or a JSON web token (JWT), which can be used, for example, in a google wallet.

When the customer wishes to redeem their coupon, their client digital wallet can send a request to the digital management system, which again performs a hardware ID verification and a geo-location of the customer device, and then provides the client device with the redemption code (that was earlier provided to the merchant system). The digital management system updates its database, recording the digital coupon as redeemed, and the client device uses its redemption code with the merchant system to receive its discount.

This solution presents several technical advantages. First, it presents a centralized coupon management system that works within the existing infrastructure framework. This results in a "frictionless" experience for both the customer and the merchant. There is no additional software or applications that need to be installed or executed. Second, by maintaining a centralized database of coupons that are each uniquely associated with client device hardware, security is enhanced as copying and unauthorized redemption are thwarted. This resolves the inherent weaknesses of digital coupons as compared to paper coupons in that it prevents them from being copied, or redeemed multiple times. Third, by geo-locating at both issuance and redemption of the digital coupon, security is further enhanced, and unique offer programs are made available to the merchant. Finally, a centralized coupon management system enables attribution to entities that are responsible for the coupon being issued.

The following is a simple example illustrating one scenario where the disclosed solution could be used. For example, a restaurant located near a local stadium may want to offer a discount to attendees of the game if the home team scores above a certain threshold. This can be generated by the digital management system as a program, and upon a trigger event (e.g., the home team scores above the threshold) a link to the coupon offer can be published. This can be provided to potential customers in the stadium, for example, by a QR code presented on the Jumbotron, or a push notification, or by having the attendees request a link (e.g., "text HOOKEM to 84444"). Upon the customer device accessing the link, they can request a coupon and the digital management system will (1) record a hardware ID of their device, and (2) verify that they are located in the stadium, then create a unique coupon object for the customer to download and store the coupon and hardware ID in a database with an "issued" status. By verifying the location of the customers during issuance, the digital management system (and therefore the restaurant) are able to ensure that only game attendees are issued the coupon (and not, for example, people watching the game on television). Following the game, if a customer who has downloaded the digital coupon wishes to redeem the coupon, they can go to the restaurant, and within their digital wallet (e.g., apple wallet) click a link on the coupon to send a redemption request to the digital management system. The digital management system can verify the hardware ID of the device with the wallet, and the location of the device (e.g., in or near the restaurant), then provide a redemption code to the client device which the customer can then show the restaurant. For example, the redemption code can be a bar code that the restaurant scans, or just a phrase (e.g., "Texas Win") for entry into the payment system of the restaurant. The digital management system can then update the status of the coupon from "issued" to "redeemed." This provides a centralized location for the restaurant to track how many coupons have been issued, and have been redeemed, in real-time or near real-time. Additionally, by geo-locating the client device at redemption it can be assured that the customer is actually present at the restaurant, and likely to use the coupon instead of, for example, providing the redemption code to a third party. Another advantage of geo-locating at redemption is that it permits fine tuning of the offer without implementing complex systems at multiple point-of-sales (POS). For example, if the restaurant is a chain that includes ten locations in the city where the stadium resides, the merchant can limit redemption to only the locations in proximity to the stadium. The merchant is able to do this using the digital management system, with no extra software or redemption scheme required by the various locations.

Additionally, coupons are often issued in order to track attribution for various marketing efforts. For example, an advertising campaign may include a specific promotion coupon (e.g. "Black Friday Sale" coupon). Merchant's often use influencers or referrals to sell their product. For example an influencer my provide a link to the product that is custom to that influencer (e.g., http://product.com/influencer1) which when selected by a user, sends the user to the product page and provides the merchant with a method of tracking the source of the sale and attributing it to the correct influencer. However, if the sale is not performed online that influencer cannot be attributed with the sale. The described solution solves that problem. Instead of the influencer providing a link that is unique to them, they can provide a coupon using the digital management system. Then regardless of where the customer redeems the coupon, the digital management system, with its centralized database of issued coupons, can enable the merchant to associate the sale with the influencer and provide proper attribution.

Figure 1:
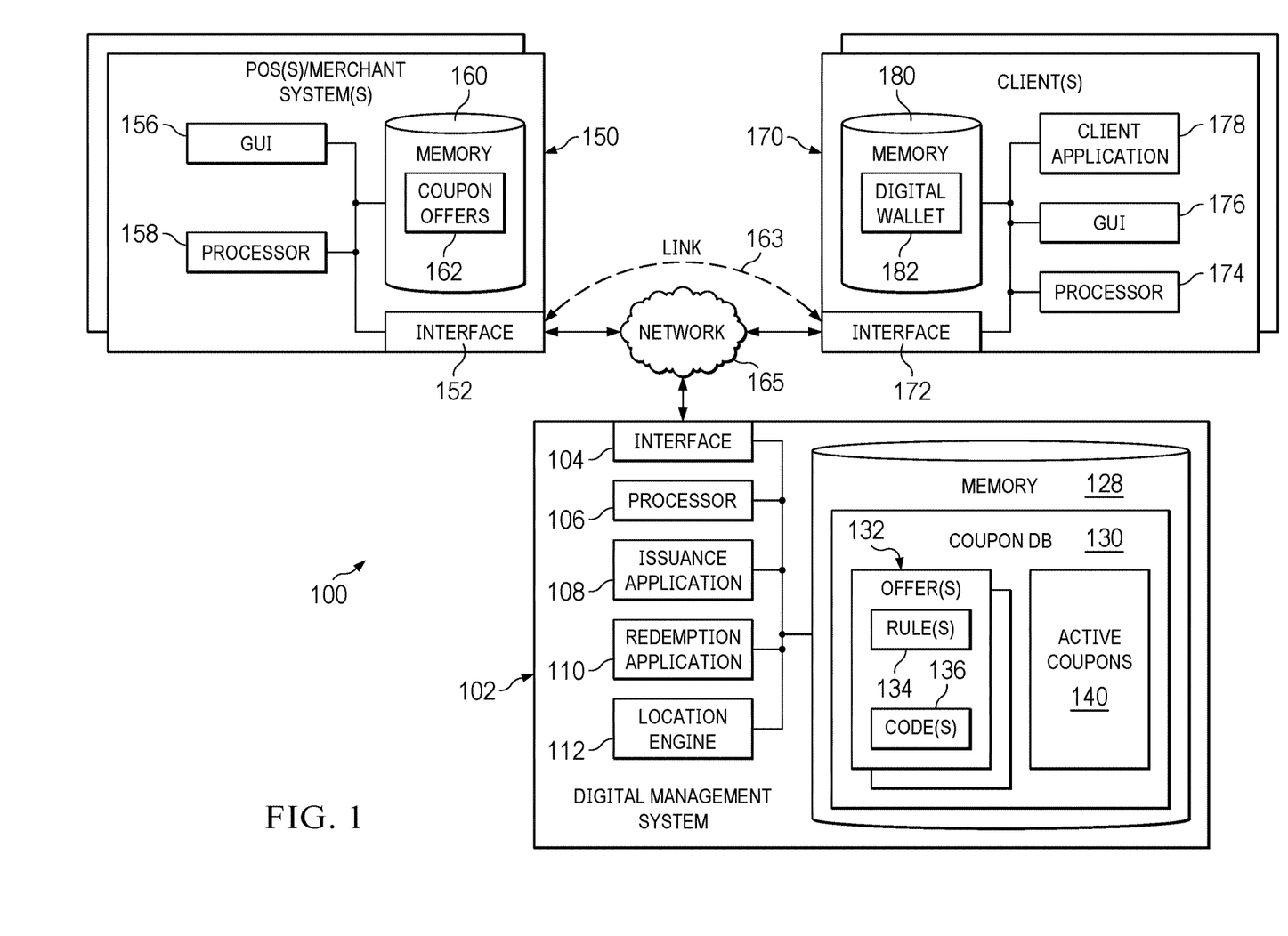
FIG. 1 depicts an overview diagram of a system for managing digital coupons.

FIG. 1 depicts an overview diagram of a system for managing digital coupons. The system 100 includes a digital management system 102, one or more client devices 170, and one or more point-of-sale/merchant systems 150. These various systems communicate using a network 165 and/or a link 163.

Network 165 facilitates wireless or wireline communications between the components of the system 100 (e.g., between the digital management system 102, the client(s) 170, etc.), as well as with any other local or remote computers, such as additional mobile devices, clients, servers, or other devices communicably coupled to network 165, including those not illustrated in FIG. 1. In the illustrated environment, the network 165 is depicted as a single network, but can comprise more than one network without departing from the scope of this disclosure, so long as at least a portion of the network 165 can facilitate communications between senders and recipients. In some instances, one or more of the illustrated components (e.g., the location engine 112, the issuance application 108, the coupon database 130, etc.) can be included within or deployed to network 165 or a portion thereof as one or more cloud-based services or operations. The network 165 can be all or a portion of an enterprise or secured network, while in another instance, at least a portion of the network 165 can represent a connection to the Internet. In some instances, a portion of the network 165 can be a virtual private network (VPN). Further, all or a portion of the network 165 can comprise either a wireline or wireless link. Example wireless links can include 802.11a/b/g/n/ac, 802.20, WiMax, LTE, and/or any other appropriate wireless link. In other words, the network 165 encompasses any internal or external network, networks, sub-network, or combination thereof operable to facilitate communications between various computing components inside and outside the illustrated system 100. The network 165 can communicate, for example, Internet Protocol (IP) packets, Frame Relay frames, Asynchronous Transfer Mode (ATM) cells, voice, video, data, and other suitable information between network addresses. The network 165 can also include one or more local area networks (LANs), radio access networks (RANs), metropolitan area networks (MANs), wide area networks (WANs), all or a portion of the Internet, and/or any other communication system or systems at one or more locations.

Digital management system 102 includes an interface 104, processor 106, issuance application 108, redemption application 110, localization engine 112, and memory 128. Digital management system 102 generally performs operations necessary for establishing digital coupon offers, issuing coupons, redeeming coupons, and managing a centralized database of issued coupons and offers.

The processor 106 of digital management system 102 can be used to perform operations of the digital management system 102. Although illustrated as a single processor 106 in FIG. 1, multiple processors can be used according to particular needs, desires, or particular implementations of the system 100. Each processor 106 can be a central processing unit (CPU), an application specific integrated circuit (ASIC), a field-programmable gate array (FPGA), or another suitable component. Generally, the processor 106 executes instructions and manipulates data to perform the operations of the digital management system 102. Specifically, the processor 106 executes the algorithms and operations described in the illustrated figures, as well as the various software modules and functionality, including the functionality for sending communications to and receiving transmissions from client 170, merchant systems 150, as well as to other devices and systems. Each processor 106 can have a single or multiple core, with each core available to host and execute an individual processing thread. Further, the number of, types of, and particular processors 106 used to execute the operations described herein can be dynamically determined based on a number of requests, interactions, and operations associated with the digital management system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

Digital management system 102 includes memory 128 storing the coupon database 130. Memory 128 of the digital management system 102 can represent a single memory or multiple memories. The memory 128 can include any memory or database module and can take the form of volatile or non-volatile memory including, without limitation, magnetic media, optical media, random access memory (RAM), read-only memory (ROM), removable media, or any other suitable local or remote memory component. The memory 128 can store various objects or data, including the coupon database 130, user and/or account information, administrative settings, password information, caches, applications, backup data, repositories storing business and/or dynamic information, and any other appropriate information associated with the entity analysis system, including any parameters, variables, algorithms, instructions, rules, constraints, or references thereto. Additionally, the memory 128 can store any other appropriate data, such as VPN applications, firmware logs and policies, firewall policies, a security or access log, print or other reporting files, as well as others. While illustrated within the digital management system 102, memory 128 or any portion thereof, including some or all of the particular illustrated components, can be located remote from the entity analysis system 102 in some instances, including as a cloud application or repository or as a separate cloud application or repository when the digital management system 102 itself is a cloud-based system. In some instances, some or all of memory 128 can be located in, associated with, or available through one or more other systems such as the merchant system 150. In those examples, the data stored in memory 128 can be accessible, for example, via one of the described applications or systems.

The coupon database 130 includes one or more offers 132 that are available for coupon issuance and redemption. Each offer can have one or more associated rules 134, which can describe the offer (e.g., discount rate, qualifying products, specific points-of-sale) and conditions associated with the offer. Conditions associated with the offer can be, for example, coupon expiration, a defined issuance geo-fence and a defined redemption geo-fence, a number of issuable coupons, a total transaction limit, or other conditions. One or more codes 136 can also be included with the offer which can include a redemption code used to allow the point-of-sale to verify the authenticity of the client device's coupon, or other codes such as encryption keys associated with communication of the offer between the digital management system 102 and the client device 170.

The database 130 also includes a number of active coupons 140. Active coupons 140 are coupons that have been issued according to one or more offers 132 and are pending redemption. Each active coupon 140 can be unique (e.g., have a unique serial number) and can be associated with a unique hardware ID of a client device 170 associated with the customer. In some implementations the active coupons 140 are stored as an array of key-value pairs, where the hardware ID of the client device 170 is recorded as the key, and the value is the active coupon ID, or a hash of the active coupon ID, or a security token associated with the active coupon ID. In this manner a database of active coupons can be maintained and rapidly searched based on the hardware of the device the coupon was issued to. In some implementations, when a coupon is generated, its generated with a unique coupon ID, and then a security token is generated by hashing the hardware ID of the client device with the unique coupon ID. The security token can be downloaded by the client device and, during redemption, can be used to verify that the device requesting redemption is the device to which the coupon was issued.

The issuance application 108 can generate new offers 132 based on received information from merchant systems 150. The issuance application generally develops rules 134 and codes 136 pursuant to the desired offer indicated by the merchant. Additionally, issuance application can generate new coupons and issue them, while storing the newly issued coupons in the coupon database 130 as active coupons 140. Upon receiving a request for issuance of a new coupon pursuant to one or more offers 132, issuance application 108 verifies that the requesting client 170 satisfies the offer's rules 134, including calling the localization engine 112 to perform a localization of the client device 170. If the client 170 satisfies the offer rules 134, the issuance application will generate a new coupon. For example, the issuance application 108 can verify the client device 170 is within a designated geo-fence, and that the rules 134 permit an additional coupon to be issued (e.g., the offer has not expired, and a limit of issuable coupons has not been reached). The new coupon can be generated with a unique coupon ID, and then a hardware ID 173 of the client device 170 can be recorded. The issuance application 108 stores the newly generated coupon ID and a hardware ID 173 of the client device 170 as an active coupon 140, then generates a security token that uniquely identifies the client device 170 and the newly generated coupon and provides it along with the coupon for download to the client device.

The redemption application 110 is used to redeem active coupons 140. When the digital management system 102 receives a request to redeem an active coupon 140, the redemption application 110 verifies the request and, if the verification is successful, provides a redemption code to the client device 170 in order for the client device to redeem the coupon. Additionally, upon successful redemption, the redemption application 110 can remove as an active coupon 140 in the coupon database 130.

Verification of the redemption request can include performing a localization using localization engine 112, verifying the security token is valid and was properly transmitted with the redemption request, and verifying the hardware ID 173 of the client device 170 requesting the redemption. In some implementations additional context is considered when verifying the redemption request. For example, the redemption application 110 can consider network IP addresses, recent redemption activity of the client device 170 or other devices, time of day, date, current weather, biometric information, or others.

The localization engine 112 can be used to confirm the location of the client device 170. In some implementations localization engine 112 performs communications necessary with the client device 170 to localize the client device 170. For example, the client device can provide GPS signals or GPS coordinates to the localization engine 112. In some implementations the localization engine 112 communicates one or more requests to the client device 170 using an HTML5 protocol to determine location. Location of the client device 170 can be determined using, for example, GPS, cell tower triangulation, local wifi network connectivity, accelerometer readings or other sensors.

The digital management system 102 communicates using interface 104. The interface 104 is used by the digital management system 102 for communicating with other systems in a distributed environment—including within the system 100—connected to the network 165, e.g., client 170, merchant system 150, and other systems communicably coupled to the illustrated digital management system 102 and/or network 165. Generally, the interface 104 comprises logic encoded in software and/or hardware in a suitable combination and operable to communicate with the network 165 and other components. More specifically, the interface 104 can comprise software supporting one or more communication protocols associated with communications such that the network 165 and/or interface 104 hardware is operable to communicate physical signals within and outside of the illustrated system 100. Still further, the interface 104 can allow the entity analysis system 102 to communicate with the client 170 and/or other portions illustrated within the digital management system 102 to perform the operations described herein.

Client device 170 are used by the customer for requesting and redeeming coupons. As illustrated, the client 170 can include an interface 172 for communication (similar to or different from interface 104), at least one processor 174 (similar to or different from processor 106), a graphical user interface (GUI) 176, a client application 178, and a memory 180 (similar to or different from memory 128).

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components can be adapted to execute any operating system, including Linux, UNIX, Windows, Mac OS®, Java™, Android™, or iOS. In some instances, the client 170 can comprise a computer that includes an input device, such as a keypad, touch screen, or other device(s) that can interact with one or more client applications, such as one or more dedicated mobile applications, including a mobile wallet or other banking application, and an output device that conveys information associated with the operation of the applications and their application windows to the user of the client 170. Such information can include digital data, visual information, or a GUI 176, as shown with respect to the client 170. Specifically, the client 170 can be any computing device operable to communicate with the digital management system 102, other clients 170, and/or other components via network 165, as well as with the network 165 itself, using a wireline or wireless connection. In general, client 170 comprises an electronic computer device operable to receive, transmit, process, and store any appropriate data associated with the system 100 of FIG. 1.

The client application 178 executing on the client 170 can include any suitable application, program, mobile application, or other component. The client application 178 includes communication applications such as SMS, email, or other communications protocols. Client application 178 can interact with the digital management system 102 applications (e.g., issuance application 108, redemption application 110, and localization engine 112) and the digital management system 102 via network 165. In some instances, the client application 178 can be a web browser, where the functionality of the client application 178 can be realized using a web application or website the user can interact with via the client application 178. In other instances, the client application 178 can be a remote agent, component, or client-side version of the digital management system 102 and/or any of its individual components. In some instances, the client application 178 can interact directly with the digital management system 102 or portions thereof. The client application 178 can be used to view, interact with, request and redeem coupons. In some implementations the client application 178 is a digital wallet such as apple wallet or google pay. In some instances, the client application 178 may be a mobile application provided by or associated with the digital management system 102.

The client application 178 can interact with memory 180 and digital wallet 182, where one or more coupon objects can be stored by the client device 170 for future redemption.

Hardware ID 173 of the client device 170 can be a unique identifier that is specific to the hardware of the client device 170. While illustrated as associated with the interface 172, the hardware ID 173 can be associated with the memory 180, processor 174, the client device 170 generally, or a combination thereof. In some implementations, the hardware ID is a MAC address, associated with a network card of a client device 170. In some implementations the hardware ID 173 is an international mobile equipment identity (IMEI) number which is a 15 digit number specific to a particular mobile device and issued by the GSM association. In some implementations, the hardware ID 173 is a UUID number generated by the operating system or other software (e.g., client application 178) executing on the client device 170.

GUI 176 of the client 170 interfaces with at least a portion of the system 100 for any suitable purpose, including generating a visual representation of any particular client application 178 and/or the content associated with any components of the digital management system 102. In particular, the GUI 176 can be used to present results of coupon requests, including whether a coupon has been issued, is ready for download, or if redeemed a redemption code can be displayed. GUI 176 can further be provided to otherwise interact and present information associated with one or more applications. GUI 176 can also be used to view and interact with various web pages, applications, and web services located local or external to the client 170. Generally, the GUI 176 provides the user with an efficient and user-friendly presentation of data provided by or communicated within the system. The GUI 176 can comprise a plurality of customizable frames or views having interactive fields, pull-down lists, and buttons operated by the user. In general, the GUI 176 is often configurable, supports a combination of tables and graphs (bar, line, pie, status dials, etc.), and is able to build real time portals, application windows, and presentations. Therefore, the GUI 176 contemplates any suitable graphical user interface, such as a combination of a generic web browser, a web-enable application, intelligent engine, and command line interface (CLI) that processes information in the platform and efficiently presents the results to the user visually.

The merchant system 150 or POS system 150 can be generally provided to allow or enable transactions between the client device 170 and the merchant system 150. The merchant system 150 can include a memory 160, which can be similar to or different from memory 128, a processor 158 (similar to or different from processor 106), a GUI 156 (similar to or different from GUI 176, and an interface 152 (similar to or different from interface 104).

In some implementations, the merchant system 150 stores coupon offers 162 that can include active offers and associated redemption codes. When the client device communicates the redemption code (that it received from the digital management system 102 upon successful redemption) the merchant system 150 can verify it against its stored coupon offers 162 and grant the discount or benefit associated with the coupon.

In some implementations merchant system 150 and client device 170 can communicate directly via link 163. Link 163 can be any suitable link, including a barcode scanner/presentation, NFC, Bluetooth, or other communication link. In some implementations, the client device 170 presents the redemption code in its GUI 176, and a user of the merchant system 150 manually verifies it before providing the benefit associated with the coupon.

While portions of the elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
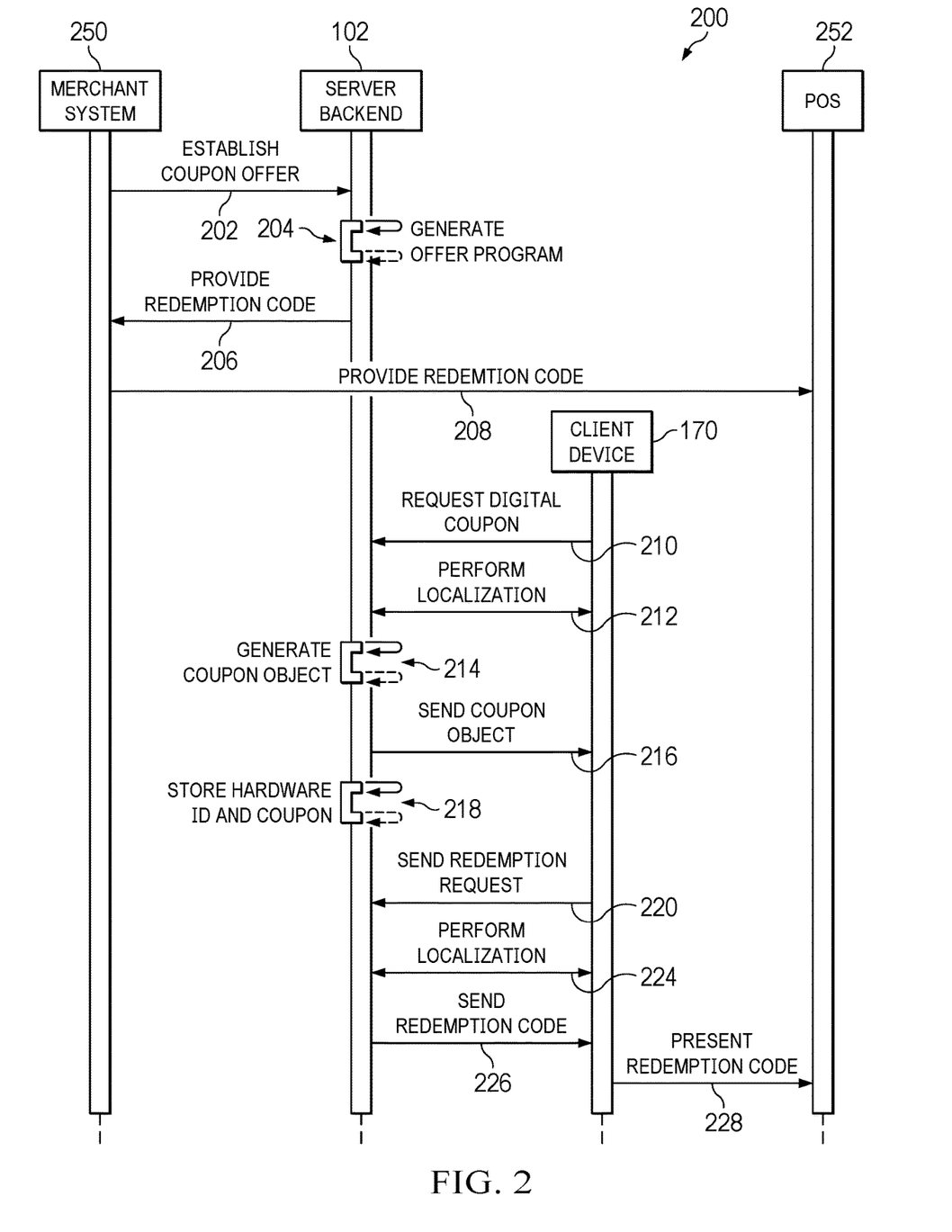
FIG. 2 is a swim lane diagram that describes an example process for issuing and redeeming a geo-located coupon.

FIG. 2 is a swim lane diagram that describes an example process for issuing and redeeming a geo-located coupon. It will be understood that process 200 may be performed, for example, by any other suitable system, environment, software, and hardware, or a combination of systems, environments, software, and hardware as appropriate. In some instances, method 200 can be performed by the system 100, or portions thereof, described in FIG. 1, as well as other components or functionality described in other portions of this description. In other instances, method 200 may be performed by a plurality of connected components or systems. Any suitable system(s), architecture(s), or application(s) can be used to perform the illustrated operations.

In the illustrated example, the merchant system 250 is separate from the point of sale system 252. In some implementations, these systems may be combined, or there may be multiple POS systems 252 within a single merchant system 250.

At 202, the merchant system 250 establishes a coupon offer with the server backend 254. The server backend 254 can be, for example, the digital management system 102 as described with respect to FIG. 1. The coupon offer can include one or more rules (e.g., expiration date, qualifying purchases, total number of coupons, specific customer type, etc.) for the coupons to be issued including geo-fences for issuance and redemption, which can be the same or different.

At 204, the server backend 254 generates an offer program, which includes codes and rules for issuance and redemption of coupons pursuant to the merchants desired coupon offers.

At 206, a redemption code associated with the offer program is provided to the merchant system. This redemption code allows the merchant system to verify that a coupon issued by the server backend 254 has been successfully redeemed at the transaction time. The redemption code can be a simple text phrase (e.g. "FALLSALE") or a barcode, QR code, or other code that a client device can present to the point-of-sale (POS) 252 to confirm that it has successfully redeemed a coupon with the server backend 254.

At 208, the redemption code is provided to the POS 252 in order for the POS to be able to verify future redemptions.

At 210, a client device 270 requests a digital coupon from the backend server 254. The client device 270 can be the same as, or different from the client device 170 as described with respect to FIG. 1. In some implementations the client device 270 requests the digital coupon in response to selecting a link, scanning a QR code, or otherwise indicating an affirmative acceptance of an offer for a digital coupon.

At 212, after verifying the hardware ID of the client device 270, the server backend 254 and the client device 270 perform a localization to verify the physical location of the client device. In some implementations the localization occurs using an HTML5 protocol such as HTML5's "geo-location API" which uses the client device's GPS receiver, or a triangulation of mobile/wifi signals to determine a latitude and longitude of the client device. The localization verification at 212 can be used to confirm the client device 270 is within a predetermined location prior to generating a coupon to issue. In some implementations the predetermined location, or geo-fence is determined by the merchant system 250 upon establishing of the coupon offer (at 202) and codified by the server backend 254 when it generates the offer program (at 204).

Following successful localization, at 214, the server backend 254 generates a coupon object. The coupon object can be a software object with attributes and properties. In some implementations the coupon object is a JSON object, or a PKPASS object, or a combination thereof. The coupon object can include a unique ID associated with the coupon. The coupon object further includes a security token that can be downloaded or otherwise made available to the client device 270 with the coupon object. The security token can be generated based on the unique hardware ID of the client device 170, the coupon ID, or a combination thereof. In some implementations, the security token is generated based on hashing a combination of the coupon ID and the hardware ID, and is used to verify the authenticity of the coupon object during future redemption operations. In some implementations, the coupon object includes a user ID (e.g., ConsumerID) or an ID that uniquely identifies the user (as opposed to the device they are using). This user ID can include information about the user such as demographics, age, spending habits, etc. In some implementations, the security token is generated based on the user ID instead of the unique hardware ID.

At 216, the coupon object, including the security token, can be sent to the client device 270, where it can be stored, for example, in a digital wallet of the client device 270.

At 218, the hardware ID of the client device 270 and the generated digital coupon are additionally stored at the server backend 254. This enables the server backend 254 to later verify the coupon upon receipt of a redemption request. In some implementations the server backend 254 maintains a database of active coupons that can be queried by the server backend 254 or third parties (e.g., merchant system 250). In this manner, the third party or server backend 254 can see how many coupons have been issued and how many are outstanding at any given time.

At 220, when the client device 270 wants to redeem the coupon, it transmits a redemption request to the server backend 254. The redemption request can include the coupon object, the security token, the hardware ID of the client device, the coupon ID, or a combination thereof. In some implementations the redemption request includes additional verification elements such as, biometrics, username/password, encryption keys, or other suitable validation features.

At 224, similarly to 212 the server backend 254 and the client device 270 perform localization. In some implementations, this localization is to ensure the client device 270 is near a point-of-sale (POS) 252 and the coupon can be redeemed. In some implementations, this second localization verifies the client device 270 is in a second geo-fence, different from the issuance geo-fence. In some implementations, the two geo-fences are the same. This second geo-fence can be defined by the merchant system 250 at the time the coupon offer is established, or automatically generated by the server backend 254. For example, when generating the offer program (204) the merchant system 250 may provide a list of qualifying POS's 252 that coupons can be redeemed at. Based on that list, the server backend 254 may generate a number of geo-fences that indicate the client device is at a qualifying POS 254. Then this second localization can verify the client device 270 is within one of those geo-fences.

At 226, the server backend 254 transmits the redemption code to the client device 270. This redemption code can be the same as the redemption code generated earlier at 206. In some implementations the redemption code is a text code, in some implementations it is a computer readable code (e.g., a barcode or a QR code, etc.). In some implementations, the redemption code is an image, such as a food item, logo, or other image representing the coupon has been redeemed. In some implementations, the redemption code transmitted depends on additional trigger conditions. In this manner, redeeming the coupon can have multiple outcomes. For example, a coupon can have a decaying value, where it is initially worth a greater discount, and the discount drops off as time passes. A discount value can be included in the redemption code and used to calculate the discount awarded upon redemption. Different trigger conditions and redemption codes can be stored in a repository, such as coupon database 130 as described above with respect to FIG. 1.

At 228, the client device 270 presents the redemption code to the POS 252. The POS 252 only needs to compare the presented redemption code to the redemption code it received at 208 to verify that the coupon has been authentically redeemed, and provide the benefit associated with the coupon to the client device 270. In some implementations, the redemption code is presented on a display of the client device 270, and a user operating the POS 252 manually reviews the redemption code. In some implementations the POS 252 directly reads the redemption code from the client device 270. For example, the POS 252 can scan a bar/QR code, or read an NFC signal representing the redemption code provided by the client device 270. In some implementations the POS 252 uses a camera and computer vision to read an image of the redemption code presented on a display of the client device 270.

Figure 3:
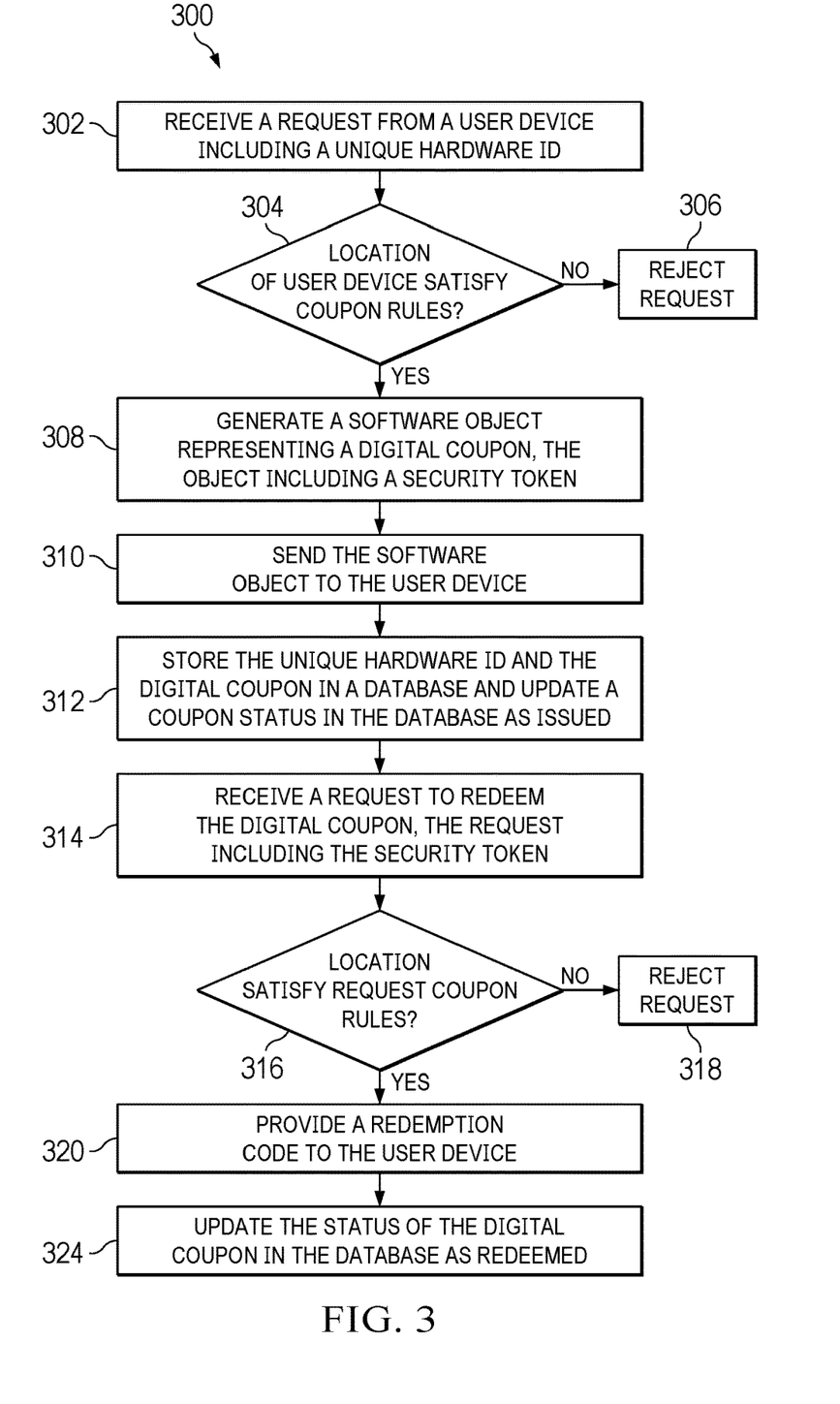
FIG. 3 is a flowchart illustrating an example process for issuing and redeeming a geo-located coupon.

FIG. 3 is a flowchart illustrating an example process for issuing and redeeming a geo-located coupon. It will be understood that process 300 may be performed, for example, by any other suitable system, environment, software, and hardware, or a combination of systems, environments, software, and hardware as appropriate. In some instances, process 300 can be performed by the system 100, or portions thereof, described in FIG. 1, as well as other components or functionality described in other portions of this description. In other instances, process 300 may be performed by a plurality of connected components or systems. Any suitable system(s), architecture(s), or application(s) can be used to perform the illustrated operations.

At 302, a request is received from a user device, the request including a unique hardware ID. The request can be for a digital coupon, and can include additional contextual information such as time, location of desired redemption, amount, or other parameters. In some implementations, the request includes a proof of purchase or other element that may be a precondition for receiving the coupon.

At 304, the location of the user device is determined. If the user device is not in a suitable location to satisfy coupon rules associated with issuance of the coupon, process 300 proceeds to 306 where the request is rejected. Otherwise, if the location of the user device satisfies coupon rules associated with issuance of the coupon, process 300 proceeds to 308.

At 308, a software object representing a digital coupon is generated. The software object can include a unique coupon ID, and one or more attributes associated with the coupon (e.g., value, discount amount, expiration date, etc.). The software object also includes a security token that is used to verify the authenticity of the digital coupon. The security token can be a hash, or a digital signature generated by a backend server, the user device, or a combination thereof. In some implementations the security token is an encryption of the hardware ID of the user device created by the backend server using a private encryption key. In this manner, any entity in possession of the public encryption key associated with the backend server can decrypt the security token and verify the hardware ID of the user device, while being assured that the security token itself was generated by the authorized backend server.

At 310, the software object is sent to the user device, which stores it for future redemption. In some implementations the software object is stored within a digital wallet of the user device, and is in a format that can seamlessly integrate with existing digital wallets (e.g., apple wallet, or google pay).

At 312, The unique hardware ID of the user device and the digital coupon are stored in a database by the backend server, and a status of that database is updated as "issued." In some implementations the digital coupon is stored as a key-value pair, where the hardware ID is the key and the value is the digital coupon, or a digital coupon ID.

At 314, a redemption request is received from the client device at the backend server. The redemption request includes the security token that was provided at issuance, and can be used by the backend server to compare the hardware ID of the device sending the redemption request with the device the digital coupon was originally issued to. For example, if the security token is user device hardware ID that has been encrypted using a private key of the server, then the server can decrypt (using a public key) and verify that the resulting hardware ID matches the hardware ID of the device transmitting the redemption request. This verifies both that the digital coupon was validly issued (as the token could only have been encrypted by the server) and that the device requesting redemption is the device to which it was issued.

At 316, for a second time, the location of the user device is determined. If the user device is not in a suitable location to satisfy coupon rules associated with redemption of the coupon, process 300 proceeds to 318 where the request is rejected. Otherwise, if the location of the user device satisfies coupon rules associated with redemption of the coupon, process 300 proceeds to 320.

At 320, a redemption code is provided to the user device. The redemption code can be a predetermined code that was established prior to process 300 and is used by a POS to verify successful redemption of the coupon. In some implementations the redemption code is a plaintext message (e.g., "SAVE20" for a 20% off discount).

At 322, the status of the digital coupon in the database is updated as redeemed. In some implementations the digital coupon is removed from the database entirely. For example, the backend server can maintain only a list of "active coupons." In some implementations, the redeemed coupon is stored in a different database, and can be stored with additional parameters such as time, date, redemption location, redeeming device, etc. This separate database can be used for future analytics or heuristics to inform future marketing or coupon offers, or studies regarding human behavior and/or purchasing patterns.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method for managing digital coupons, the method comprising:
   receiving a request for a digital coupon from a user device, the request comprising a unique hardware identifier (ID) associated with the user device;
   sending a first localization request to the user device, the first localization request directing the user device to access, using an HTML geolocation API, a first location of the user device;
   in response to receiving, from the user device, the first location of the user device:
      verifying that the first location of the user device is within a first geo-fence;
      in response to the first location being within the first geo-fence, generating a software object representing the digital coupon, the software object comprising a security token;
      sending the software object to the user device;
      updating a status of the digital coupon as issued in a database;
      storing the unique hardware ID in the database; and
      associating the unique hardware ID with the digital coupon;
   receiving, from the user device, a request to redeem the digital coupon, the request comprising the security token and in response:
      sending a second localization request to the user device, the second localization request directing the user device to access, using the HTML geolocation API, a second location of the user device;
      receiving, from the user device, the second location of the user device and verifying that the second location is within a second geo-fence;
      providing, to the user device and in response to the second location being within the second geo-fence, a redemption code configured to enable redemption of the digital coupon; and
      updating the status of the digital coupon as redeemed.

2. The method of claim 1, wherein the unique hardware ID is at least one of a MAC address, a UUID, or an IMEI.

3. The method of claim 1, wherein the first location and the second location of the user device are generated using an HTML5 protocol.

4. The method of claim 1, wherein the security token is generated based on the unique hardware ID, and wherein the security token is generated using asymmetric encryption.

5. The method of claim 1, wherein the storing the unique hardware ID in the database and associating the unique hardware ID with the digital coupon comprises storing the unique hardware ID and the digital coupon in the database as a key value pair, and wherein the hardware ID is a key of the key value pair and the digital coupon is a value of the key value pair.

6. The method of claim 1, wherein providing the redemption code comprises identifying a trigger condition, and providing the redemption code according to the trigger condition.

7. A non-transitory, computer-readable medium storing one or more instructions executable by a computer system to perform operations comprising:
   receiving a request for a digital coupon from a user device, the request comprising a unique hardware identifier (ID) associated with the user device;
   sending a first localization request to the user device, the first localization request directing the user device to access, using an HTML geolocation API, a first location of the user device;

in response to receiving, from the user device, the first location of the user device:
   verifying that the first location of the user device is within a first geo-fence;
   in response to the first location being within the first geo-fence, generating a software object representing the digital coupon, the software object comprising a security token;
   sending the software object to the user device;
   updating a status of the digital coupon as issued in a database;
   storing the unique hardware ID in the database; and
   associating the unique hardware ID with the digital coupon;
receiving, from the user device, a request to redeem the digital coupon, the request comprising the security token and in response:
   sending a second localization request to the user device, the second localization request directing the user device to access, using an HTML geolocation API, a second location of the user device;
   receiving, from the user device, the second location of the user device and verifying that the second location is within a second geo-fence;
   providing, to the user device and in response to the second location being within the second geo-fence, a redemption code configured to enable redemption of the digital coupon; and
   updating the status of the digital coupon as redeemed.

8. The computer-readable medium of claim 7, wherein the unique hardware ID is at least one of a MAC address, a UUID, or an IMEI.

9. The computer-readable medium of claim 7, wherein the first location and the second location of the user device are generated using an HTML5 protocol.

10. The computer-readable medium of claim 7, wherein the security token is generated based on the unique hardware ID, and wherein the security token is generated using asymmetric encryption.

11. The computer-readable medium of claim 7, wherein the storing the unique hardware ID in the database and associating the unique hardware ID with the digital coupon comprises storing the unique hardware ID and the digital coupon in the database as a key value pair, and wherein the hardware ID is a key of the key value pair and the digital coupon is a value of the key value pair.

12. The computer-readable medium of claim 7, wherein providing the redemption code comprises identifying a trigger condition, and providing the redemption code according to the trigger condition.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
   receiving a request for a digital coupon from a user device, the request comprising a unique hardware identifier (ID) associated with the user device;
   sending a first localization request to the user device, the first localization request directing the user device to access, using an HTML geolocation API, a first location of the user device;
   in response to receiving, from the user device, the first location of the user device:
     verifying that the first location of the user device is within a first geo-fence;
     in response to the first location being within the first geo-fence, generating a software object representing the digital coupon, the software object comprising a security token;
     sending the software object to the user device;
     updating a status of the digital coupon as issued in a database;
     storing the unique hardware ID in the database; and
     associating the unique hardware ID with the digital coupon;
   receiving, from the user device, a request to redeem the digital coupon, the request comprising the security token and in response:
     sending a second localization request to the user device, the second localization request directing the user device to access, using an HTML geolocation API, a second location of the user device;
     receiving, from the user device, the second location of the user device and verifying that the second location is within a second geo-fence;
     providing, to the user device and in response to the second location being within the second geo-fence a redemption code configured to enable redemption of the digital coupon; and
     updating the status of the digital coupon as redeemed.

14. The system of claim 13, wherein the unique hardware ID is at least one of a MAC address, a UUID, or an IMEI.

15. The system of claim 13, wherein the first location and the second location of the user device are generated using an HTML5 protocol.

16. The system of claim 13, wherein the security token is generated based on the unique hardware ID, and wherein the security token is generated using asymmetric encryption.

17. The system of claim 13, wherein providing the redemption code comprises identifying a trigger condition, and providing the redemption code according to the trigger condition.

* * * * *